Figure 1:
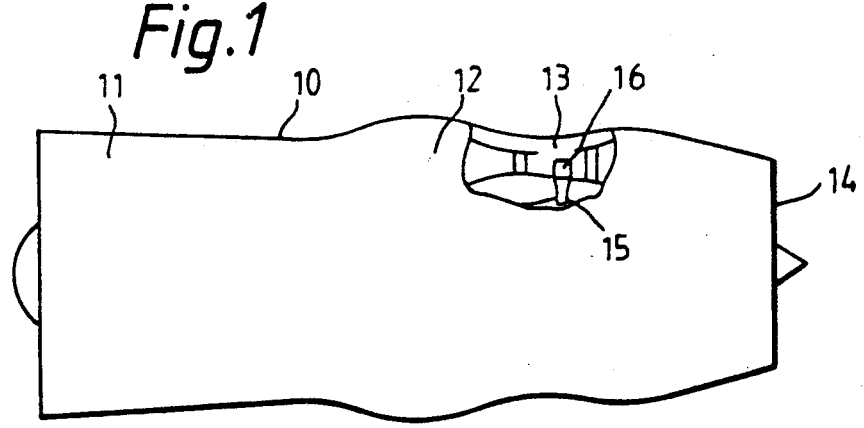

United States Patent [19]

Evans

[11] Patent Number: 5,110,262
[45] Date of Patent: May 5, 1992

[54] ATTACHMENT OF A GAS TURBINE ENGINE BLADE TO A TURBINE ROTOR DISC

[75] Inventor: Neil M. Evans, Bristol, England
[73] Assignee: Rolls-Royce plc, London, England
[21] Appl. No.: 615,406
[22] Filed: Nov. 19, 1990

[30] Foreign Application Priority Data

Nov. 30, 1989 [GB] United Kingdom ............... 8927096

[51] Int. Cl.⁵ ............................................... F01D 5/30
[52] U.S. Cl. ................................................ 416/219 R
[58] Field of Search ............. 416/219 R, 219 A, 221, 416/248, 500

[56] References Cited

U.S. PATENT DOCUMENTS

| | | | |
|---|---|---|---|
| 4,169,694 | 10/1979 | Sanday | 416/219 R |
| 4,191,509 | 3/1980 | Leonardi | 416/219 R |
| 4,260,331 | 4/1981 | Goodwin | 416/219 R |
| 4,692,976 | 9/1987 | Andrews | 416/219 R |
| 4,820,126 | 4/1989 | Gavilan | 416/221 |
| 4,824,328 | 4/1989 | Pisz et al. | 416/248 |

FOREIGN PATENT DOCUMENTS

| | | |
|---|---|---|
| 1088146 | 3/1955 | France . |
| 1453838 | 10/1976 | United Kingdom . |
| 87/00778 | 2/1987 | World Int. Prop. O. . |

Primary Examiner—John T. Kwon
Attorney, Agent, or Firm—Oliff & Berridge

[57] ABSTRACT

In a gas turbine firtree root tooth structure in which a firtree root is retained in a shaped slot in a turbine rotor disc by virtue of teeth cooperating with notches in the slot, the bearing surface of a root tooth is barrelled against a planar surface of the respective notch so as to give point contact against that surface, whereby, under load, the barrelled surface crushes so as to override pitch tolerances and even out load distribution. If the barrelling is located at or in the vicinity of the tooth face center, the tendency of the tooth to crack under repeated loadings is minimized.

5 Claims, 2 Drawing Sheets

ATTACHMENT OF A GAS TURBINE ENGINE BLADE TO A TURBINE ROTOR DISC

This invention relates to an improved attachment of a gas turbine engine blade to a turbine rotor disc.

As is well known in the art, the airfoil blades of a gas turbine engine, both in the compressors and the turbines, usually extend radially from a disc or drum or similar rotor structure. The engagement between the blades and the supporting rotor disc is a most important part of the design of any such bladed rotor; it must sustain the loads carried from the blade to the rotor without failure, and it must be overall as small as possible in order to reduce the size of the blade root and disc rim to a minimum.

In the past, a variety of root attachments have been proposed and used. These have usually been of a general type in which the root has projections which engage with undercut surfaces of a corresponding slot or groove in the periphery of the rotor disc. The slots may extend between opposed faces of the disc, or may extend circumferentially of the disc periphery. One widely used member of the former class is called a "firtree" root attachment, after the approximate resemblance of the cross-section of the blade provided to a fir tree. One such firtree root is described and illustrated in our British Patent 2030657B. The present invention is particularly concerned with firtree root attachments.

The increased performance demanded of gas turbine engines in modern aircraft, especially in those of the military genre, imposes very high loads on the turbine blades and correspondingly high loads on the teeth of the firtree root attachments.

After several hundred hours of high performance loading it is possible for a serration crack to appear in the firtree root. Of the estimated serration stress more than half may be due to tooth bending. In a high performance high pressure turbine up to 50% of the total load carried by the turbine disc will be incorporated in the blade firtree and its associated disc firtree. For turbines designed for even higher performance this percentage of total load carried by the disc will increase even more.

The problem of increased stressing of the root teeth due to increased performance requirements may be overcome by reducing the number of teeth per root from 4 to 2, for example, and by reducing the tooth aspect ratio accordingly. The tooth aspect ratio is the ratio of the perpendicular distance between the apex of a tooth and an adjacent trough and the width of the tooth between adjacent troughs.

Reduction of the tooth aspect ratio results in a stiffer tooth and lower bending stresses. However, this beneficial effect can raise a further problem in that the load distribution between pairs of teeth radially disposed is made worse due to the reduced tooth deflections being less able to accomodate the radial tolerances between adjacent pairs of teeth. It is an object of the present invention to alleviate this problem.

Accordingly, in general terms the present invention seeks to alleviate undesirable load distributions in a firtree root tooth by providing localized contact only between a flank of the tooth and an adjacent undercut surface of a corresponding slot in the rotor disc to which the root is attached In particular, there may be provided a root attachment for a blade of a gas turbine engine, the attachment comprising a firtree root on the blade which has at least one tooth adapted to engage with a notch within a shaped slot formed in the disc to which the blade is attached, characterized in that an undercut surface of the notch adjacent a flank of a said at least one tooth is substantially planar and the flank has a convex curvature having a maximum elevation relative to a straight line drawn between the tip of the tooth and the base of an adjacent trough, whereby initial contact between the undercut surface and the flank under zero loading is solely at the location of said maximum elevation and under increased loading the flank crushes at said location to provide an area of load-spreading contact around said location.

Preferably, the location of the maximum elevation is at a point providing an optimum balance between root and disc notch stresses, which point may be at or near the mid-point of the tooth flank.

Preferably, the firtree root comprises at least two opposed pairs of teeth.

Preferably, only one flank of a tooth, being the radially outer flank of the tooth with respect to the axis of the disc, is convexedly curved, the other flank being substantially planar.

Figure 2:
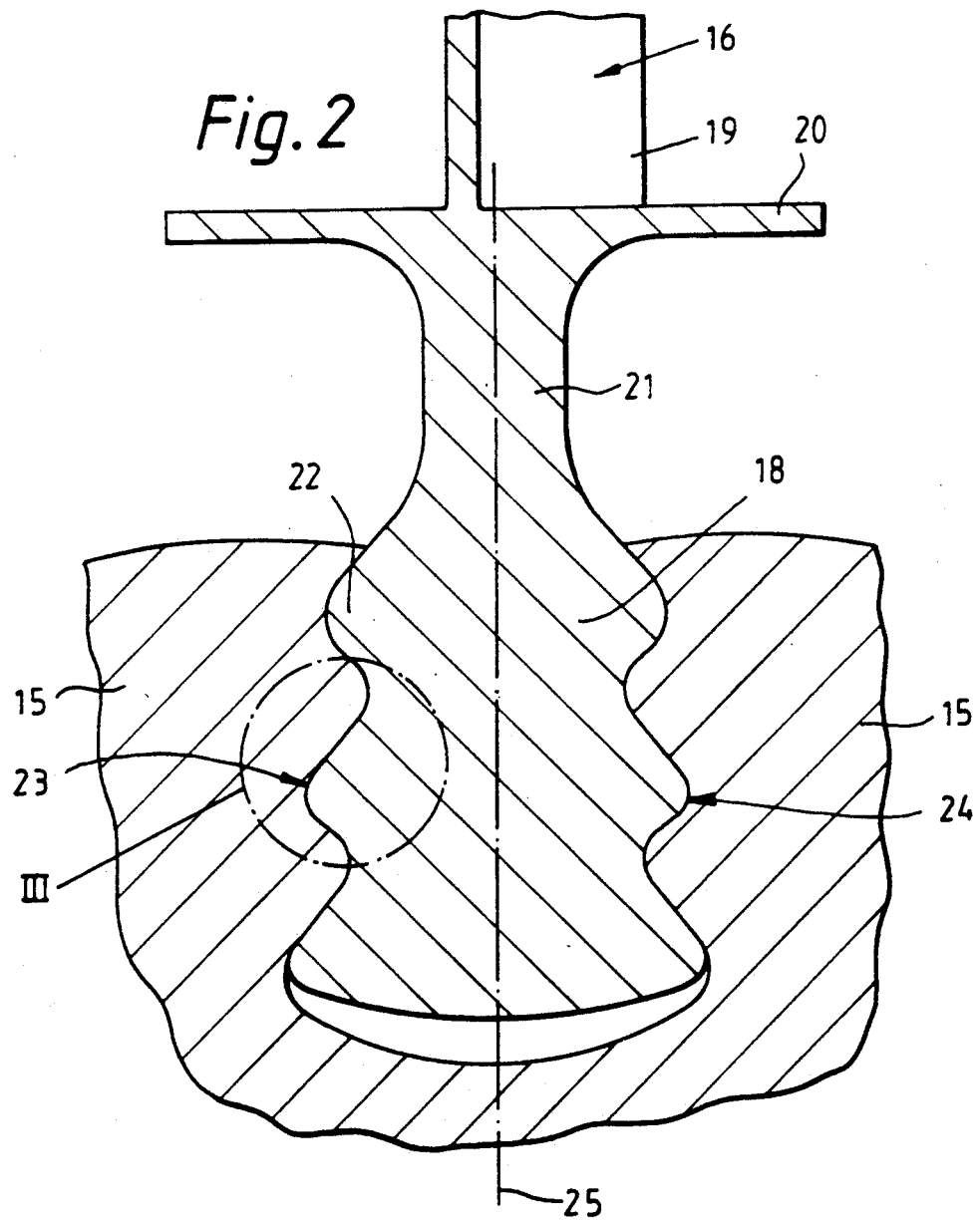
Figure 3:
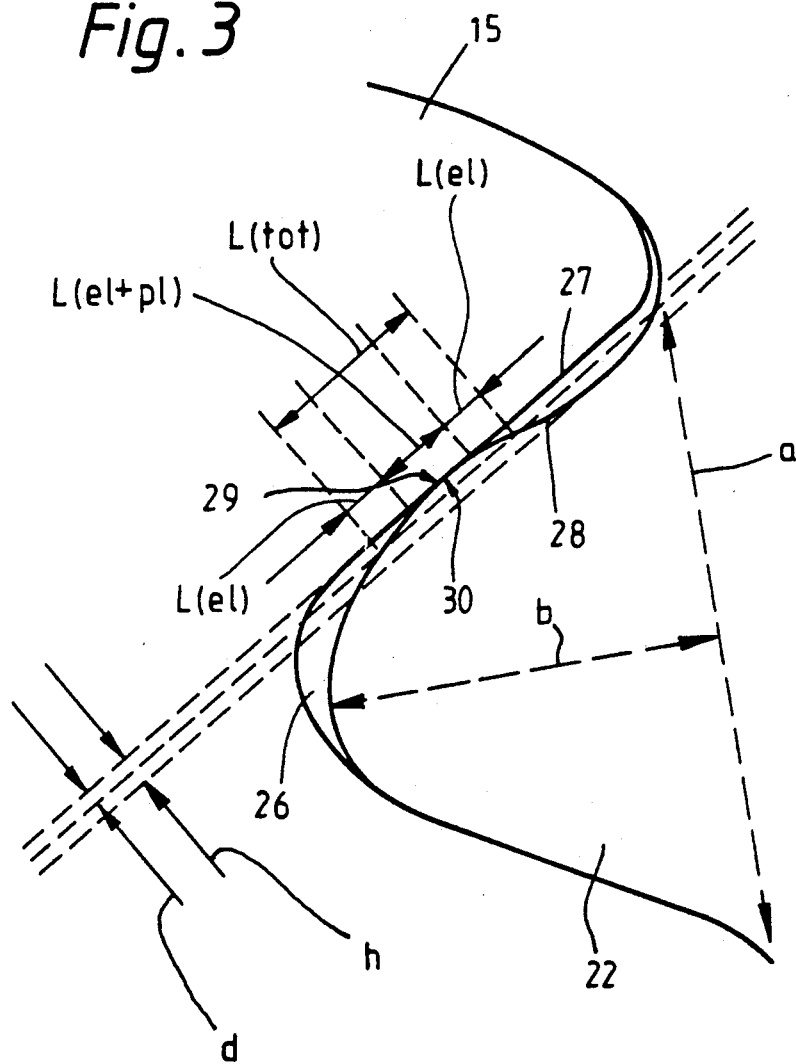

The invention will now be described by way of example only with reference to the accompanying diagrammatic non-scale drawings in which:

FIG. 1 is a partly cut away view of an aircraft gas turbine engine having a root attachment in accordance with the invention, FIG. 2 is an enlarged section through a blade and root portion of the engine of FIG. 1 and in accordance with the invention, and FIG. 3 is a further enlargement of portion III of the section of FIG. 2, showing further detail of the invention.

In FIG. 1 there is shown an aircraft gas turbine engine comprising a casing 10, within which are mounted a compressor 11, a combustion chamber 12, a turbine 13 and a final nozzle 14. Operation of the engine overall is conventional and is therefore not described herein.

The casing 10 is shown cut away in the vicinity of the turbine 13 to expose to view the turbine rotor disc 15 and its associated rotor blades 16. As is usual in gas turbines, the blades 16 are not integral with the rotor disc 15 but are held in axially extending (but not parallel with the disc axis) slots or grooves by the engagement therein of correspondingly shaped roots 18. The blades 16 are mounted in an angularly spaced apart circumferential row on the disc 15.

FIG. 2 shows in enlargement a cross-section through the mid-section of one of the blades 16 and the associated area of disc 15, the plane of the section being perpendicular to the disc axis. Shown in section are the airfoil 19, the platform 20, the root shank 21, and the root 18 itself. The root 18, as shown, is provided with six teeth 22 disposed in two opposed plane arrays 23, 24 of three teeth each, symmetrically disposed about the central plane 25 of the blade.

Each tooth 22 is located in a respective notch 26 extending perpendicularly to the central plane 25. Each notch 26 is of a shape corresponding generally to the shape of the tooth 22 located in it, the undercut surface 27 of the notch, that is, the surface nearest the radially outer surface of the disc, being planar in its extent from the trough of the notch to the peak between that notch and the next. However, as will be described below, the profile of each notch 26 is not identical to that of the corresponding tooth 22.

It will be appreciated that the teeth 22 have a longitudinal extent equal to that of the entire root; that is, they extend into and out of the plane of the paper in the orientation of FIG. 2. However, the shape of the teeth remains constant throughout their longitudinal extent and the further enlarged view of FIG. 3 enables this shape to be understood more easily. It should be understood that all the teeth have the same general profile so that although only one tooth is described with reference to FIG. 3, all the other teeth will in fact be similar.

As is shown in FIG. 3, the radially outermost flank 28 of tooth 22 is convexedly curved so that it contacts the opposed undercut surface 27 of the notch 26 at a contact point 29 of that surface. This curvature of the tooth flank is herein termed "barrelling". The barrelling of the flank 28 is chosen so that it reaches a maximum elevation relative to a straight line drawn between the tip of the tooth and the base of an adjacent trough at a point 30 which is chosen as that point of the tooth which provides an optimum balance between blade root and disc notch stresses when subjected to load, and which corresponds to the point of contact 29 with the notch surface 27. This point 30 will usually be at or near the center of the tooth flank.

The effect of the barrelling of the tooth flank 28 against the planar undercut surface 27 of the notch 26 is that under load the bearing surface of the tooth will crush and spread out in area around the point 30 so as to override pitch tolerance and even out load distributions and thereby minimize the onset of cracking.

A number of chain lines drawn in FIG. 3 show the dimensions of the tooth 22 and the distortions taking place when it is under load against the undercut surface of the notch 26. Accordingly, "a" is the width of the tooth 22 across its base between adjacent troughs, and "b" is the height of the tooth, and, as mentioned above, the ratio b/a is the aspect ratio of the tooth, "h" is the barrel height of the tooth flank 28, "d" is the maximum depth of surface deformation of the barrelling under load, "L(tot)" is the bearing surface contact width, "L(el)" is that portion of the bearing surface subject to elastic deformation only, and "L(el+pl)" is that portion of the bearing surface subject to a combination of plastic and elastic deformation. Therefore, $L(tot) = L(el+pl) + 2 \times L(el)$.

Although three pairs of teeth 22 are illustrated, it will be understood that in other embodiments of the invention fewer or more than three pairs of teeth may be used without departing from the scope of the invention. Further, in some embodiments, the point 30 of maximum-elevation of the curvature of the tooth flank need not coincide with the center point of the tooth flank if it is desired to move the balance between the various stresses towards the position of peak blade stress in the trough between two teeth, or towards the position of peak disc stress, which is in the trough of a disc notch.

I claim:

1. In a gas turbine engine having a plurality of airfoil blades attached to a rotor disc, a root attachment for one blade, comprising a firtree root on the blade which has at least one tooth adapted to engage with a notch within a shaped slot formed in the disc to which the blade is attached, said at least one tooth having a tip and there being a trough adjacent the tooth, such that an undercut surface of the notch adjacent a flank of said at least one tooth is substantially planar and the flank has a convex curvature having a maximum elevation relative to a straight line drawn between the tip of the tooth and the base of the adjacent trough, whereby initial contact between the undercut surface and the flank under zero loading is solely at a location of said maximum elevation and under increased loading the flank crushes at said location to provide an area of load-spreading contact around said location.

2. A root attachment as claimed in claim 1 wherein the location of the maximum elevation is at a point providing an optimum balance between the root and disc notch stresses.

3. A root attachment as claimed in claim 2 wherein the point is at or near the mid-point of the tooth flank.

4. A root attachment as claimed in claim 1 wherein the firtree root comprises at least two opposed pairs of teeth.

5. A root attachment as claimed in claim 1 wherein only one flank of a tooth, being the radially outer flank of the tooth with respect to the axis of the rotor, is convexedly curved, the other flank being substantially planar.

* * * * *